Nov. 8, 1966 R. H. HIMES 3,284,099
BACK-UP CONTROL FOR TRAILER
Filed May 29, 1964 2 Sheets-Sheet 1
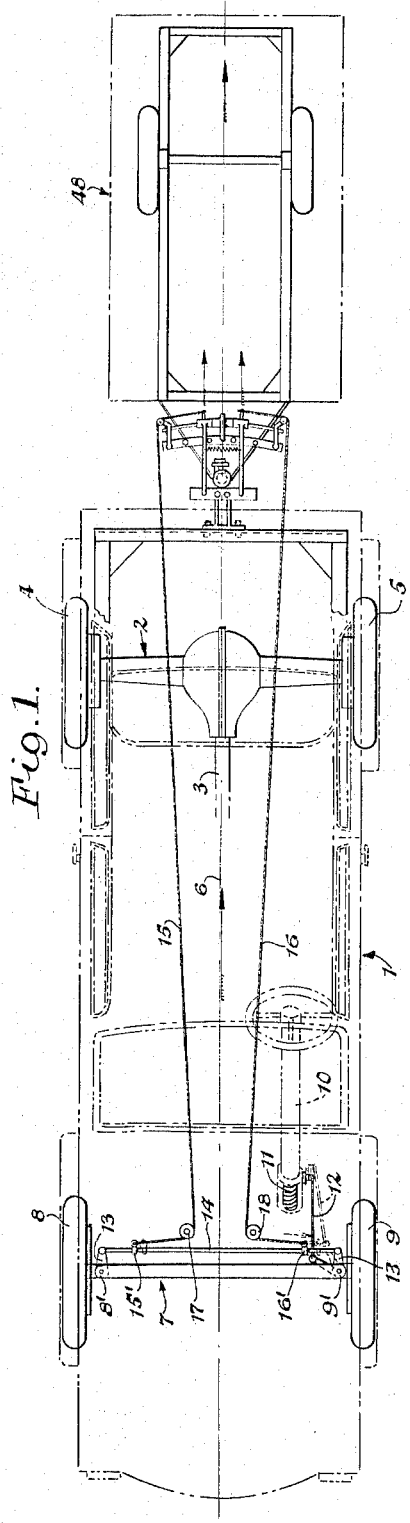
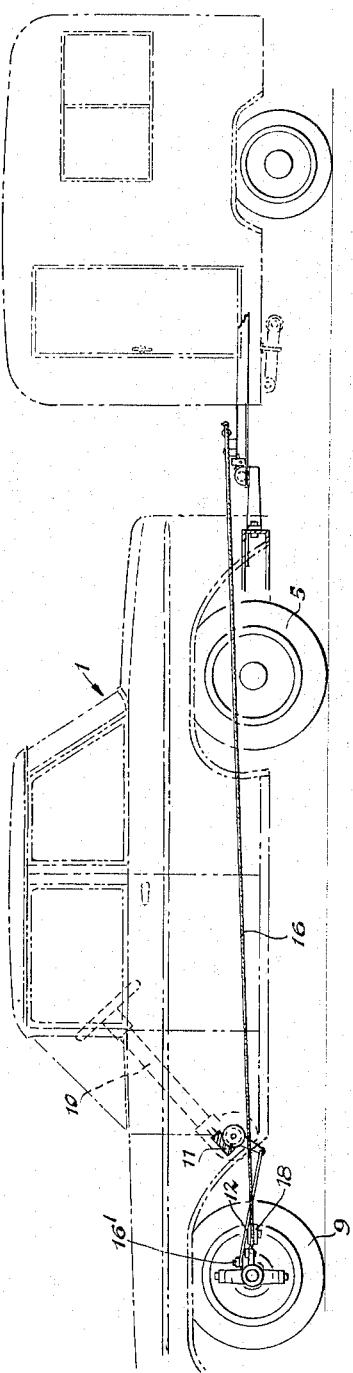
INVENTOR.
RAYMOND H. HIMES
BY
Bean, Brooks, Buckley & Bean
ATTORNEYS

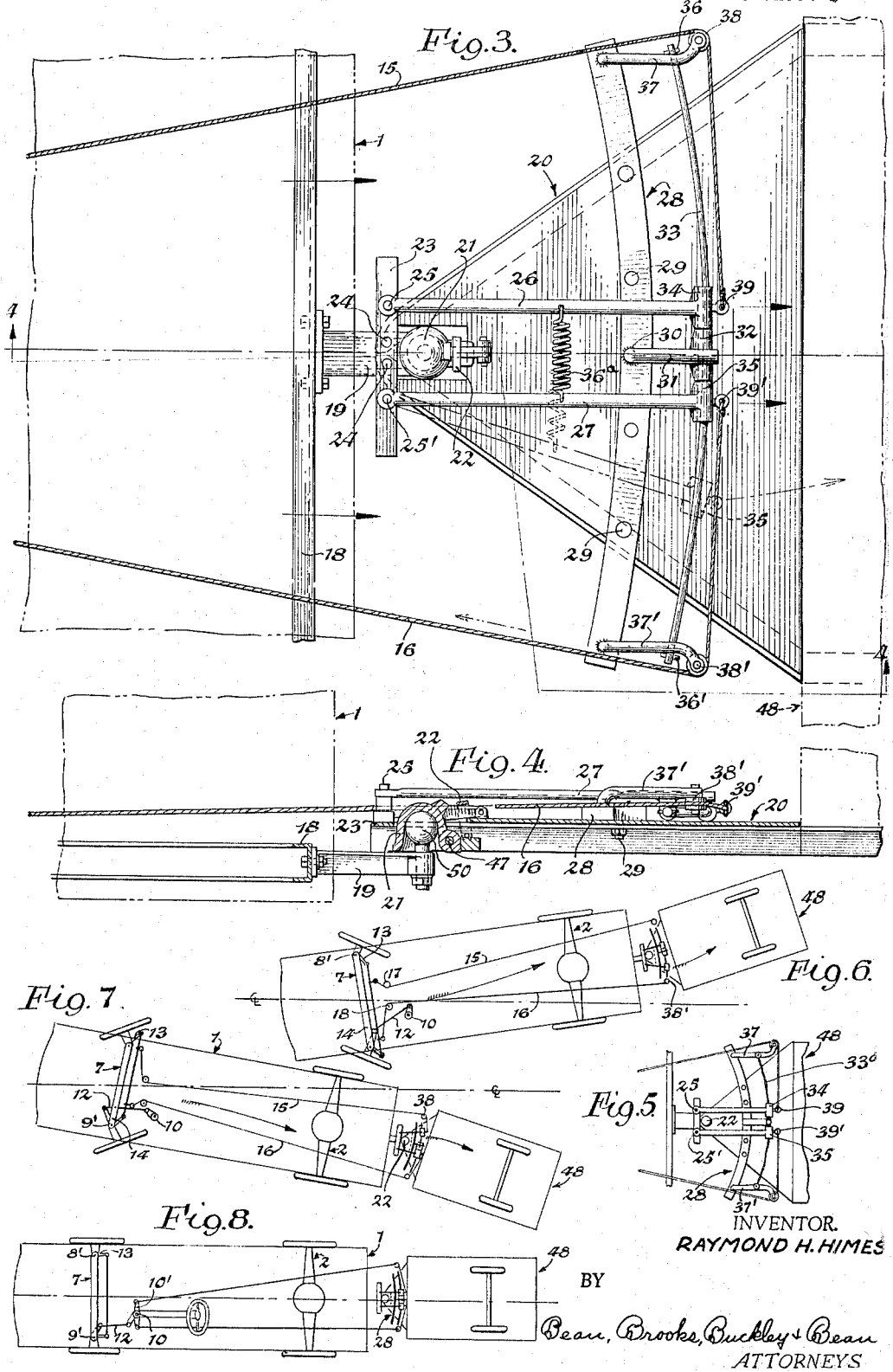

United States Patent Office 3,284,099
Patented Nov. 8, 1966

3,284,099
BACK-UP CONTROL FOR TRAILER
Raymond H. Himes, 15 Merrimac St., Buffalo, N.Y.
Filed May 29, 1964, Ser. No. 371,198
8 Claims. (Cl. 280—446)

The present invention relates to an improved control permitting positive imposition of force to a trailer connected to tractor means, such as a family automobile, where the tractor and trailer are connected through the usual ball hitch.

The use of trailers in conjunction with conventional pleasure cars, has increased at a rapid rate and the usual connection between the trailer and the pleasure car is generally effected through the very simple ball hitch. Such means of connection is simple and positive and is readily connected and readily disconnected, and causes a minimum of trouble in straight haulage of the trailer.

The disadvantage of the ball hitch becomes apparent when it is necessary to back the trailer. The connection between the trailer and tractor being effectively a single-point connection, the backing force is transmitted through such point and the universal nature of the connection permits the trailer to turn thereabout with great readiness. Thus, should a wheel of the trailer encounter an obstruction, such as roughness in the roadway, upon which it is traveling, or bear against a small stone or the like, movement of such wheel is retarded without, however, preventing the free backing movement of the companion wheel upon the opposite wheel of the trailer. The consequence of such stoppage of one wheel, with free movement permitted in the companion wheel upon the opposite side of the trailer, induces the frequently encountered and frustrating action generally called "jackknifing."

The present invention provides means for positively controlling the imposition of force through a ball hitch to prevent jackknifing when backing on the average roadway.

The present invention also provides means whereby the driver of the tractor, to which a trailer is attached by a ball hitch, may resolve the force applied to the universal joint of the ball hitch whereby a variable amount of the applied force may be directed to a desired side of the center line of force through the ball hitch whereby to control the movement of the trailer when the trailer is backed up.

In the drawings, wherein like parts are designated with like numerals,

FIG. 1 is a plan view, with certain parts in phantom, of a usual family or pleasure car, hereinafter called a tractor, connected to a trailer by a usual ball hitch, and having the force-resolving means of the present invention attached between the tractor and trailer.

FIG. 2 is a side view in elevation of the tractor-trailer assemblage of FIG. 1.

FIG. 3 is an enlarged detailed view of the ball hitch and force-resolving means of the present invention employing a flexible rod whereby to control the application of the backing force to the trailer, while, FIG. 4 is a section taken on line 4—4 of FIG. 3, looking in the direction of the arrows at the ends of such line, and FIG. 5 is a view of the ball hitch and force-resolving means employing a flexible cable whereby to control the application of the backing force to the trailer.

FIG. 6 illustrates schematically, a view showing the the operation and arrangement of the stabilizer for the resolution of force to maintain the turning action of the trailer to the right of the driver or counter-clockwise, while FIG. 7 illustrates schematically, a view showing the operation and arrangement of another modification of the stabilizer for the resolution of force to maintain the turning action of the trailer and, in this instance, to the left of the driver or clockwise, while FIG. 8 shows an alternative arrangement for operating the stabilizer when backing the trailer.

Referring more particularly to the drawings, a pleasure car is illustrated at 1, which car, called herein a tractor, is provided with a driven axle contained in axle housing 2, the axle whereof being connected to a source of power as shown by the transmission shaft 3. The driven axle is fitted at one end as shown, with a driven wheel 4 and a companion driven wheel 5 at the other end, which wheels provide the necessary roadway traction for moving the tractor either forward or backward in a general direction along the center line of the tractor, with reference to arrow 6 shown in FIG. 1.

The tractor is also provided with axle 7 having a wheel 8 at one end thereof and a wheel 9 at the other end thereof, the wheels being attached to axle 7 through conventional articulated portions 8' and 9'.

The direction of movement of the tractor, with reference to the center line, is controlled by a steering mechanism such as that illustrated in FIGS. 1 and 2, where a steering wheel 10 is connected through a worm gear 11 and rod 12 through toggle 13 to tie rod 14 whereby wheels 8 and 9 are caused to move in synchrony about conventional pins connecting the articulated ends 8' and 9' of axle 7.

In one modification of the invention, cables 15 and 16 are connected at one end, to a movable portion of the steering mechanism, such as tie rod 14, through clamping means 15' and 16' after passing about appropriate guide members 17 and 18. Cables 15 and 16 pass rearwardly of the tractor and are attached at their other end to means for holding the trailer in a predetermined position with respect to the center line of the tractor-trailer combination when the trailer is being moved rearwardly, all as more fully described hereinafter.

Instead of the direct connection to a portion of the steering mechanism, as described above, the cables may extend to the driving compartment of the tractor for manual manipulation.

Referring more particularly to the enlarged views of FIGS. 3 and 4, tractor 1 is connected to the trailer through the conventional ball hitch. Ball 50 is connected to a convenient portion of the rear of the tractor, such as a frame member 18 thereof, through extension frame member 19, one end of which carries the ball, the other end of which is connected to the frame of the tractor as stated. Ball 50 may be connected as shown by bolt means 49, to extension frame 19.

Trailer 48 carries at its front end a conventional "A" frame 20 which is fitted at the apex of the A with an inverted socket 21, as best seen in FIG. 4, pivoted about pin 47, for registry with ball 50 and conventional locking mechanism 22 bearing against socket 21 to maintain the connection, to complete the ball hitch. There is attached to a convenient rear portion of the tractor, such as extension frame member 19, the lateral bar 23, the attachment thereto, as shown being through bolts 24.

Lateral bar 23 carries detachably connected thereto through bolted pins 25 and 25', rearwardly extending arms 26 and 27 which pivot about bolted pins 25 and 25'. As clearly shown in FIG. 3, the pivot points are positioned upon opposite sides of the ball hitch.

A supporting bar 28 is bolted or otherwise attached at 29 to "A" frame 20, which bar has attached to it, centrally thereof, at 30, one end of the spur 31, the other end of the spur carrying a short sleeve 32 to which is attached a guide member 33. As illustrated, the guide member comprises an arcuate flexible member 33, either a rod or cable, which extends above and in a plane substantially parallel to the plane of the "A" frame. Pivoted arms 26 and 27 extend rearwardly of the tractor for a distance sufficient to be assembled with the flexible member 33 and to this end are fitted with, or as shown, are formed with sleeves 34 and 35 which embrace flexible member 33 and follow such member when either or both of pivoted arms 26 and 27 is moved about the pivot points 25 or 25'. The movement of arms 26 and 27 is circumscribed by providing stop members at the ends of flexible rod 33, such as the cotter pins 36 and 36' shown in the drawing, where flexible member 33a is a cable, the free ends of the cable are attached to spurs 37 and 37'. The normal position of rest of arms 26 and 27 is the general parallelism shown in FIG. 3 with sleeves 34 and 35 resting against member 32 to which flexible member 33 is affixed. Arms 26 and 27 are urged to this position by a tensioned flexible member attached to such arms intermediate the ends thereof, as by the coil spring 36a specifically illustrated in FIG. 3.

Supporting bar 28 has attached thereto, in any convenient manner, a pair of spurs 37 and 37' removed from the central spur 31 and generally positioned toward the ends of the bar 28, which spurs are fitted with cable guiding means, as for instance the pulleys 38 and 38' about which cables 15 and 16 move. These cables are attached to arms 26 and 27 at the ends thereof removed from their pivot points, as for instance to eye bolts 39 and 39'. Movement of cable 16 in the direction of the phantom arrow will therefore move arm 27 to the phantom position shown in FIG. 3. Cables 15 and 16 are provided with couplings so as to permit ready disengagement, as for instance by the use of spring buckles attached to eyebolts 39 and 39' or at the front end of the cables or the cables may be provided with couplings intermediate their ends.

By reversing the tractor and backing the tractor-trailer assemblage, the force imposed upon the trailer will be resolved so that all of such force is not imposed upon the trailer through the universal connection of the ball hitch 50. The imposed force will also be transmitted through arm 26 or 27 to the flexible rod or cable 33 and by this means making possible the imposition of additional force to the trailer at a desired side of the center line to produce continued movement of a trailer wheel should added frictional force be imposed thereagainst, by reason of unevenness in the roadway. Without the force-resolving means of the invention, as described, the net result would be to retard movement of one wheel with resultant frustrating jack-knifing.

Thus, movement of cables 15 and 16 serve to adjust arm 26 or 27 away from its center position of rest toward the free end of the flexible member 33 when it is desired to impose force on one side or other of the center line of the assemblage.

It will thus be seen that in the operation of backing the trailer, resistance to such operation is interposed by the friction between the roadway and the wheels of the trailer; so long as that friction is directed against the trailer wheels equally, the trailer may be backed in the predetermined and initial direction generally given by the driver. Thus, to back the trailer in a generally clockwise direction, the driver will steer the tractor slightly to the left, while moving forward, stop the tractor, go into reverse gear, spin the steering wheel in the opposite direction to the position shown in FIG. 7 and then back up. So long as the force directed against each wheel of the trailer remains substantially balanced, the trailer may be backed continuously and in the desired clockwise direction. Should, however, the force interposed against one wheel of the trailer greatly exceed the force interposed against the other wheel, the trailer will tend to jackknife around the wheel where the greater force is interposed since the backing force is applied at a single point, namely, the ball hitch. The present invention assures the imposition on the trailer of a force on a desired side of the center line of the combination whereby to maintain the direction of movement of the trailer by giving to the trailer what might be called a "helping hand."

In the modification illustrated in FIG. 3, the backing force is transmitted through arms 26 and 27 to rod 33. This rod is flexible and free-floating to compensate for the slight play at the ball hitch. The "helping hand" force on the flexible rod 33 then urges the trailer counter-clockwise, as shown by the phantom arrow when arm 27 is in the position shown in phantom.

In the modification shown in FIG. 5, sleeves 34 and 35 move along a flexible cable 33a, which cable receives the force from an arm moved away from the center line, since the cable is attached to the spurs 37 and 37' at its extremities.

In summary, the force-resolving equipment, when attached to the steering mechanism, as shown in FIG. 1, is controlled by the movement of cables 15 and 16. When tie rod 14 is moved by the action of the steering mechanism, such movement exerts a pull upon one of the cables, as for instance 16, and produces slack in companion cable 15. This action has been described in conjunction with the showing in FIG. 3.

With reference to FIG. 6, movement of steering arm 12 by steering mechanism 10, to start the front wheels in a direction to produce counter-clockwise movement of the tractor and trailer, pulls the arm to which cable 16 is attached, as shown in greater detail in FIG. 3, whereby a part of the force transmitted through the ball hitch is exerted against one side of the trailer to maintain the position of articulation between tractor and trailer, whereby the latter continues in the desired counter-clockwise motion, as shown by the arrows.

In FIG. 7, the tractor-trailer unit is brought into the position shown, then the front wheels spun to the position shown, whereby slack is now induced in cable 16, but pull exerted upon cable 15. When the tractor is put into reverse gear and backed up, the force exerted upon the trailer is resolved and a portion, called herein the helping hand, is exerted upon a side of the trailer with respect to the center line of the tractor-trailer combination, whereby the trailer is moved in the clockwise direction.

A modification is shown in FIG. 8 wherein a simple unitary bracket 10' is attached to steering shaft 10. This bracket provides at its opposite ends a place for anchoring cables 15 and 16 and thereby providing pull on one cable and slack upon its companion cable. As shown, arms 26 and 27, as more closely illustrated in the enlarged version of FIG. 3, produce an even distribution of force so that the tractor-trailer combination may be backed up in a direction parallel to the center line of the combination.

When the tractor-trailer is moved forwardly, the restraining influence of cables 15 and 16 tend to damp and substantially eliminate any sideways swaying movement of the trailer about the ball hitch.

A feature of singular importance in connection with the force-resolving mechanism of the present invention, permitting one to control positively the direction of the trailer when the tractor is moving in reverse, is the ease with which the tractor and trailer may be disconnected.

Cables 15 and 16 being detachably connected by eyebolts 39 and 39' in any convenient fashion, as by the use of spring-clip buckles or other device, the cables may be detached from such eyebolts and left attached to the tractor and disposed of by being loosely coiled about the extension 19, for instance. Or, if desired, the cables may be detached at their front ends from the tractor.

Cables 15 and 16 having been detached from eyebolts 39 and 39', arms 26 and 27 are readily removed from the pivot point by removing bolts 25, whereupon the arms may be lifted from the pivot ends and remain assembled with flexible member 33 or cable 33a and can rest upon the usual apron 20.

Final unhitching is performed in the usual way by lifting safety catch 22 and breaking the connection between ball hitch 50 and connecting cover 21.

What is claimed is:

1. In combination, a motor vehicle, a second vehicle, means at the rear of said motor vehicle pivotally connecting said second vehicle thereto, and means for controlling direction of motion of the second vehicle when backing it, the last mentioned means comprising a member attached to the second vehicle and extending transversely thereof and arms pivotally connected at their forward ends to the rear of the motor vehicle adjacent the pivotal connection between the two vehicles and normally trailing from the first vehicle and connected to said member for movement laterally outwardly on said member from said trailing position so as to impose a force upon the second vehicle, preventing gross deviation of movement thereof from the desired direction of movement thereof, and means for selectively moving said arms as aforesaid.

2. In combination, a steerable tractor, a ball hitch rearwardly thereon and a trailer provided with wheels on each side thereof, connected to the tractor through said ball hitch and means for maintaining a predetermined rearward motion of the trailer when backing the trailer, comprising a pair of arms pivotally connected to the rear of the tractor on opposite sides of the ball hitch, a flexible arcuate member attached to the front of the trailer and extending laterally thereof, each of said pair of arms extending to and being operatively engaged with said arcuate member and being adapted to move along said arcuate member from the center thereof and in opposite directions, and means attached to said arms for moving the same separately along said arcuate member and for imposing a force upon the trailer preventing gross deviation of movement thereof from the predetermined direction of movement thereof.

3. The combination of claim 2 wherein the pair of arms are removably assembled with the rear of the tractor.

4. The combination of claim 2 wherein the pair of arms are removably assembled with the rear of the tractor at the pivot points.

5. The combination of claim 2 wherein the means for moving the arms extend forwardly of the tractor and are activated by the means for steering the tractor.

6. The combination of claim 5 wherein the means for moving the arms comprises cables attached to the arms at points remote from the pivot points thereof and extending to points remote from the center of the arcuate member and forwardly of the tractor whereby the same can be manipulated by a driver of the tractor to exert and maintain tension on either of the cables to move either of the arms from the center of the arcuate member.

7. The combination of claim 6 wherein the cables attached at one end of the arms are attached at the other end to a portion of the steering mechanism of the tractor.

8. The combination of claim 6 wherein the cables attached at one end of the arms extend to steering compartment of the tractor whereby they may be normally placed under tension by an occupant of the driving compartment of a tractor.

References Cited by the Examiner
UNITED STATES PATENTS

| | | | |
|---|---|---|---|
| 2,510,525 | 6/1950 | Smart et al. | 280—443 |
| 2,557,471 | 6/1951 | Romig et al. | 280—468 X |
| 3,168,332 | 2/1965 | Eynon | 280—468 X |
| 3,212,793 | 10/1965 | Pietroroia | 280—443 |

LEO FRIAGLIA, *Primary Examiner.*